United States Patent
Volpe et al.

(10) Patent No.: US 11,392,406 B1
(45) Date of Patent: Jul. 19, 2022

(54) ALTERNATIVE INTERRUPT REPORTING CHANNELS FOR MICROCONTROLLER ACCESS DEVICES

(71) Applicant: Amazon Technologies, Inc., Seattle, WA (US)

(72) Inventors: Thomas A Volpe, Austin, TX (US); Mark Banse, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/660,716

(22) Filed: Oct. 22, 2019

(51) Int. Cl.
  *G06F 9/48* (2006.01)
  *G06F 9/30* (2018.01)
  *G06F 9/46* (2006.01)
  *G06F 11/07* (2006.01)

(52) U.S. Cl.
  CPC ........ *G06F 9/4812* (2013.01); *G06F 9/30101* (2013.01); *G06F 9/468* (2013.01); *G06F 11/0757* (2013.01); *G06F 11/0772* (2013.01)

(58) Field of Classification Search
  CPC .... G06F 9/4812; G06F 9/468; G06F 9/30101; G06F 11/0772; G06F 11/0757
  See application file for complete search history.

(56) References Cited

U.S. PATENT DOCUMENTS

| | | | |
|---|---|---|---|
| 6,356,986 B1 | 3/2002 | Solomon et al. | |
| 6,606,677 B1 * | 8/2003 | Okbay | G06F 13/24 710/260 |
| 7,585,593 B2 | 9/2009 | Chang | |
| 7,623,518 B2 | 11/2009 | Faulk, Jr. | |
| 8,347,350 B2 | 1/2013 | Lum et al. | |
| 9,256,531 B2 | 2/2016 | Cho | |
| 9,342,258 B2 | 5/2016 | Thanner et al. | |
| 11,175,839 B1 | 11/2021 | Volpe et al. | |
| 2005/0078694 A1 * | 4/2005 | Oner | G06F 13/4027 370/412 |
| 2007/0204087 A1 * | 8/2007 | Birenbach | G06F 9/4812 710/264 |
| 2008/0154481 A1 * | 6/2008 | Stroia | F01N 11/007 701/109 |
| 2011/0106993 A1 * | 5/2011 | Arinobu | G06F 9/4812 710/262 |
| 2015/0082449 A1 | 3/2015 | Mushkatblat | |

(Continued)

OTHER PUBLICATIONS

IBM NN8806396, Interrupt Pulse Mask Enable, IBM Technical Disclosure Bulletin, Jun. 1988 (Year: 1988).*

(Continued)

*Primary Examiner* — Idriss N Alrobaye
*Assistant Examiner* — Ronald T Modo
(74) *Attorney, Agent, or Firm* — Robert C. Kowert; Kowert, Hood, Munyon, Rankin & Goetzel, P.C.

(57) ABSTRACT

Alternative reporting channels are implemented for interrupts to a microcontroller device. An access device for a microcontroller may support performing requests from a microcontroller to controlled devices via an interconnect. The access device may have a separate communication channel with at least one of the controlled devices to receive interrupts. When an interrupt is signaled, an indication of the interrupt may be stored at a storage device at the access device. The microcontroller may read from the storage device at the access device to obtain the indication of the interrupt.

20 Claims, 9 Drawing Sheets

(56) References Cited

U.S. PATENT DOCUMENTS

| | | |
|---|---|---|
| 2015/0095623 A1 | 4/2015 | Ermolaev et al. |
| 2017/0139852 A1* | 5/2017 | Xu .......................... G06F 13/24 |
| 2017/0255575 A1* | 9/2017 | Niu .......................... G06F 13/42 |

OTHER PUBLICATIONS

U.S. Appl. No. 16/660,704, filed Oct. 22, 2019, Thomas A. Volpe et al.

U.S. Appl. No. 16/660,715, filed Oct. 22, 2019, Thomas A. Volpe et al.

* cited by examiner

| protocol sequence 610 | Read Word 612 | | | | | Return Mem Response 614 | | Read Word 616 | | | | | Return Mem Response 618 | |
|---|---|---|---|---|---|---|---|---|---|---|---|---|---|---|
| Byte # | 0 | 1 | 2 | 3 | 4 | 0 | 1 | 0 | 1 | 2 | 3 | 4 | 0 | 1 |
| To MCU Access Device | CMD | ADDR [31:24] | ADDR [23:16] | ADDR [15:8] | ADDR [7:0] | NOP | NOP | CMD | ADDR [31:24] | ADDR [23:16] | ADDR [15:8] | ADDR [7:0] | CMD | NOP |
| To MCU | PTPS | NOP | NOP | NOP | NOP | CMD | RD IN PROG | NOP | NOP | NOP | NOP | NOP | MEM TXN DRP | RD SUCCESS |

Second Read begins before the first has completed

Interconnect transaction for the first read has not completed

PTPS byte indicates that the second Read Word transaction has been dropped

Read Success indicates that the first Read Word transaction has completed successfully

ALTERNATIVE INTERRUPT REPORTING CHANNELS FOR MICROCONTROLLER ACCESS DEVICES

BACKGROUND

Control devices, such as microcontrollers (MCUs), are often implemented separately from the devices that are controlled. For instance, a system-on-a-chip (SOC) may implement various devices to perform different functions which interact through a common interconnect. A microcontroller for the SOC may be separately implemented. In order to perform control functions, the microcontroller may utilize an access device on the SOC to perform requests from the microcontroller to the different controlled devices via the interconnect. Similarly, events that occur at the controlled devices, such as various errors, may be reported back to the microcontroller through the access device. Therefore, techniques that improve the speed at which a microcontroller receives error indications via an access device are highly desirable.

BRIEF DESCRIPTION OF THE DRAWINGS

FIG. 6 illustrates an example protocol sequence that indicates a memory transaction dropped response, according to some embodiments.

Figure 1:
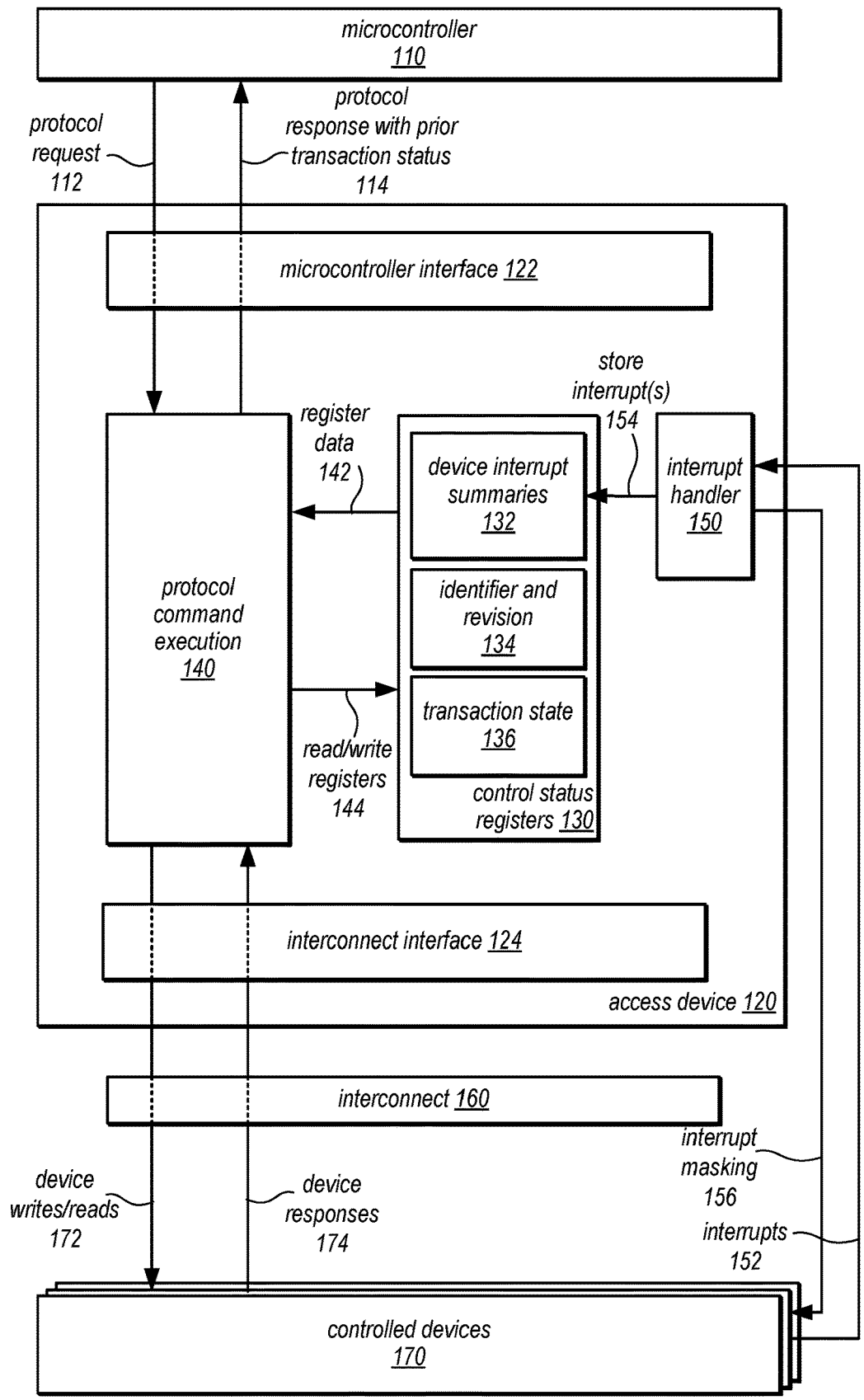
FIG. 1 illustrates a logical block diagram of alternative interrupt reporting channels for microcontroller access devices, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C.

In other instances, A may be determined based solely on B.

DETAILED DESCRIPTION

Various techniques for alternative interrupt reporting channels for microcontroller access devices are described herein. A microcontroller's ability to quickly handle events indicated as interrupt signals or other indications by controlled devices allows the microcontroller to improve the performance of those devices, or the system as a whole.

Because communications between a microcontroller and controlled devices often pass through an access device, the capability of the access device to provide interrupt indications can impact the ability of the microcontroller to handle errors or other management scenarios implicated by the interrupts.

For example, an access device may support a communication protocol or other interface specification, such as Serial Peripheral Interface (SPI) or Inter-Integrated Circuit (I2C), which may determine the performance of a microcontroller utilizing the access device to perform management functions. To instruct, program, or otherwise configure a controlled device, a microcontroller may send one command (or multiple commands) via the supported interface of the access device (e.g., to write instructions or other configuration information to locations at the controlled device). The access device may then parse, interpret, or otherwise translate the commands into a format to be sent via a different interface for an interconnect (e.g., a bus) connected to the controlled device and the access device, so that the requested command is performed at the controlled device.

Alternative interrupt reporting channels for microcontroller access devices may improve the speed at which interrupts and other errors can be reported to a microcontroller for resolution, in some embodiments. For example, instead of being notified of interrupt signals via indications sent from controlled devices to the access device via the interconnect, which may also be supporting other communications between controlled devices and other system components and thus suffer from congestion or failure, interrupt signals can be directly reported to an access device via a direct communication channel (e.g., a wire) that allows a controlled device to assert an interrupt that will be stored at the access device. In this way, a microcontroller can read interrupts from the access device, instead of submitting requests to read interrupts from the controlled devices (which includes the additional request translation and transmission work if the interconnect is utilized).

Further improvements in the speed of error reporting and other information signaling can be realized by providing alternative forms of error reporting within the supported communication protocol between the microcontroller and the access device, in some embodiments. For example, an access device may utilize spare capacity in response messages to provide status or other information, such as error indications, to a microcontroller. In this way, status or other information does not have to be separately requested by the microcontroller and/or separately returned by the access device.

FIG. 1 illustrates a logical block diagram of alternative interrupt reporting channels for microcontroller access devices, according to some embodiments. Microcontroller 110 may be implemented for various controlled systems or devices 170, such as a controlled device 210 in a hardware accelerator 200 as discussed below in FIG. 2, or various other systems that utilize a microcontroller, in addition to or instead of a general processor, to control one or more system devices (e.g., in a computer system 1000 as discussed below with regard to FIG. 9 or other type of system, such as an embedded system that stands alone without a host processor or system). Controlled devices 170 may be individual components implemented as part of (or all components of) various kinds of embedded system, system-on-a-chip (SOC), system-on-a-module (SOM), peripheral device (e.g., for dedicated processing tasks, such as graphics processing, machine learning processing, etc.), or other system or device architecture that utilizes a microcontroller to manage the performance of the controlled device 170. As illustrated in FIG. 1, access device 120 may support the management operations of microcontroller 110 by receiving requests via one interface, a micro controller interface 122, and sending the request to recipients of controlled devices 170 via an interconnect 160 that connects access device 120 to controlled device 170.

For example, microcontroller interface 122 may support the communication using channels, such as the wires or other circuitry that connect microcontroller 110 to access device 120. As noted above, different communication protocols may be supported by microcontroller interface 122. In at least one embodiment, microcontroller interface 122 may support SPI communications between microcontroller 110 and access device 120. Therefore, as depicted in FIG. 1, microcontroller 110 may send a protocol request 112 to access device, received via microcontroller interface 122 for performance at access device 120 (e.g., by protocol command execution 140). Correspondingly, a protocol response 114 may be sent from access device 120 to microcontroller 110 via microcontroller interface 122.

Figure 3:
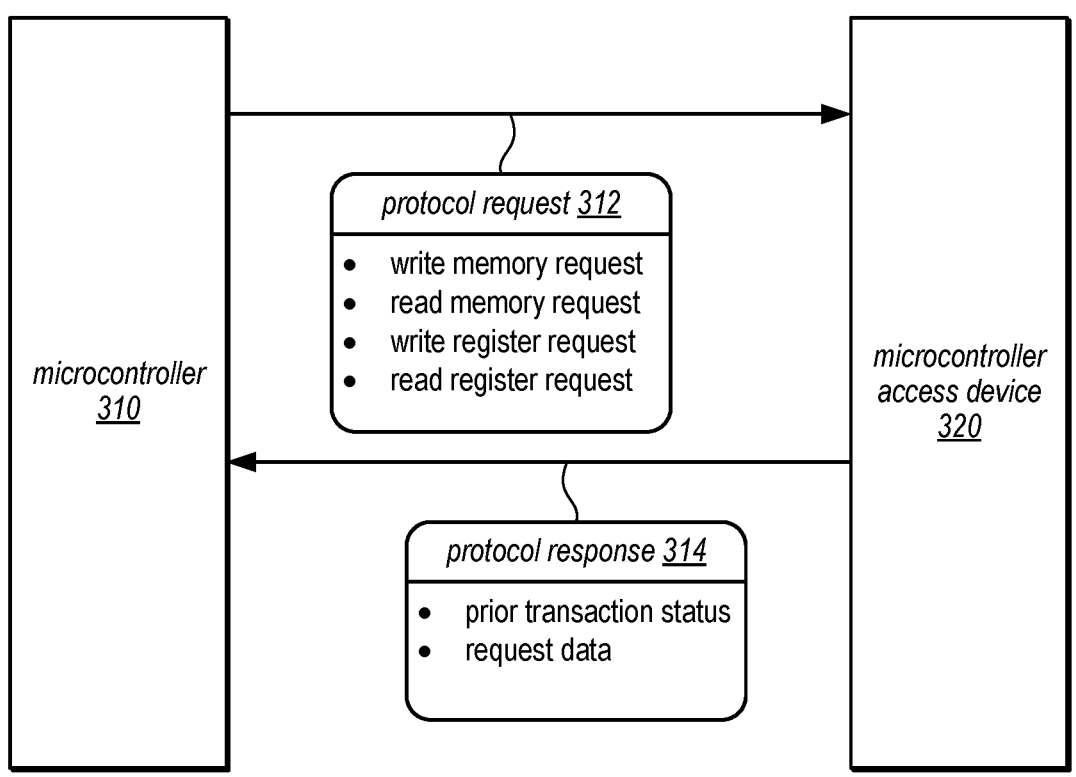
FIG. 3 is a logical block diagram illustrating an example communication protocol between a microcontroller and a microcontroller access device, according to some embodiments.

Protocol requests 112 may result in different read or write actions, as discussed in more detail below with regard to FIG. 3. Access device 120 may implement protocol command execution 140 which may accept, parse, and execute a received protocol request 112. For instance, a request to read or write to storage devices on access device 120, such as control status registers 130, may be received, and the appropriate storage device (or storage devices) read. As illustrated in FIG. 1, read or write requests to control status registers 130 may be supported and performed as indicated at 144. In the case of read requests, data read from a register 142 may be received at protocol command execution for return to microcontroller 110 as part of a protocol response 114.

Protocol command execution 140 may utilize stored transaction state 136 in control status registers 130, in some embodiments. The transaction state 136 may hold, for instance, the fields, parameters, or other information instructed in a protocol request 112. In some embodiments, the status information, including error indications for a request may be stored, in some embodiments. As discussed below with regard to FIGS. 3-6, prior transaction status may be signaled in a response to new transaction submitted, as indicated at 114.

Protocol requests 112 may also request reads and writes 172 to controlled devices 170. Such reads or writes 172 may be performed via interconnect 160, which may be sent via a different interface implemented at access device 120, interconnect interface 124, to effect various management operations or functions, such as modifying controlled device 170 operation, restarting, reconfiguring, or resetting a controlled device 170, or various other management operations. Device responses 174, which may be received in some scenarios, may be received back at protocol command execution 140 via interconnect 160 and interconnect interface 124, where a protocol response 114 may be generated and sent to microcontroller 110.

Interconnect 160 may be one of various different kinds of bus architectures, such as Advanced eXtensible Interface (AXI) (as also discussed below with regard to FIG. 2). Interconnect interface 124 may support the various communication channels (e.g., circuitry) and protocols (e.g., interface specification) to read, write, or otherwise signal various devices connected to interconnect 160, including controlled devices 170, in various embodiments. For instance, interconnect interface 124 may implement an AXI slave and AXI master interface to receive and send communications via an AXI interconnect.

In various embodiments, an alternative communication channel to interconnect 160 and interconnect interface 124 may exist between controlled devices 170. This alternative communication channel may include wires or other circuitry that allows for direct signaling between a controlled device (e.g., an interrupt controller, processing engine, or other controlled device). In this way, interrupts 152 may be signaled directly to access device 120, bypassing interconnect 160, and thus avoiding any delays, or other performance problems that could arise from utilizing interconnect 160. As noted earlier, access device 120 may implement storage devices, such as control status registers 130. Control status registers 130 (or other storage devices) may store interrupt information for microcontroller 110 to access via protocol request 112. In this way, microcontroller 110 can perform a local read at access device, which can be significantly faster than perform reads to controlled devices 170 to obtain the same interrupt information.

Figure 7A:
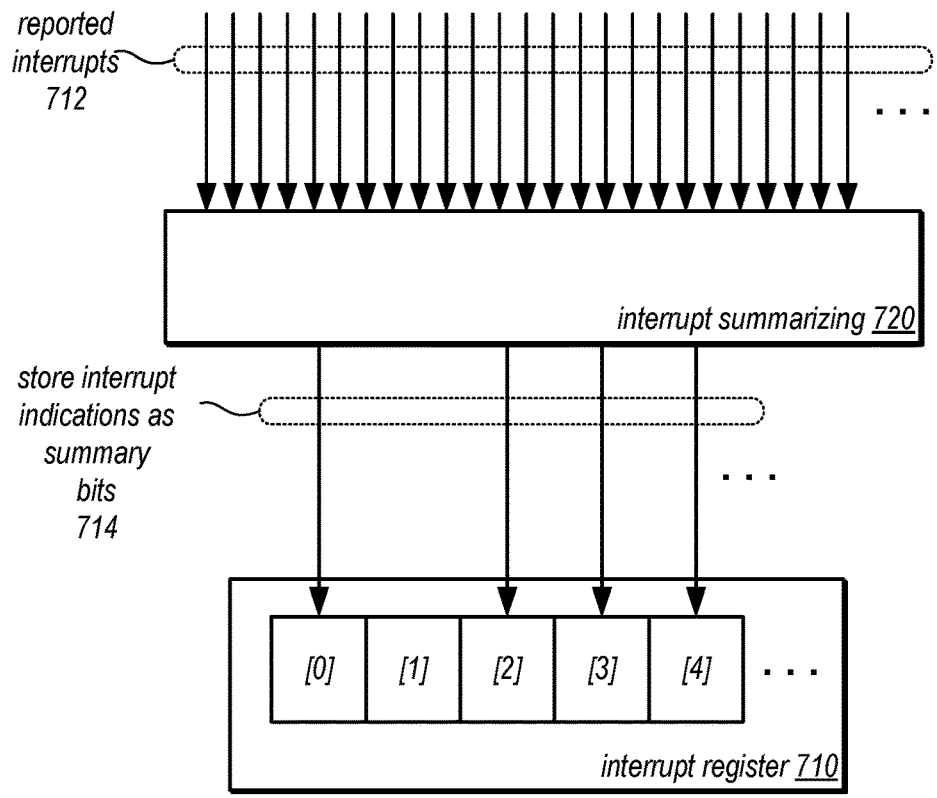
FIGS. 7A and 7B illustrate example encoding techniques for interrupts stored at a microcontroller access device, according to some embodiments.
Figure 7B:
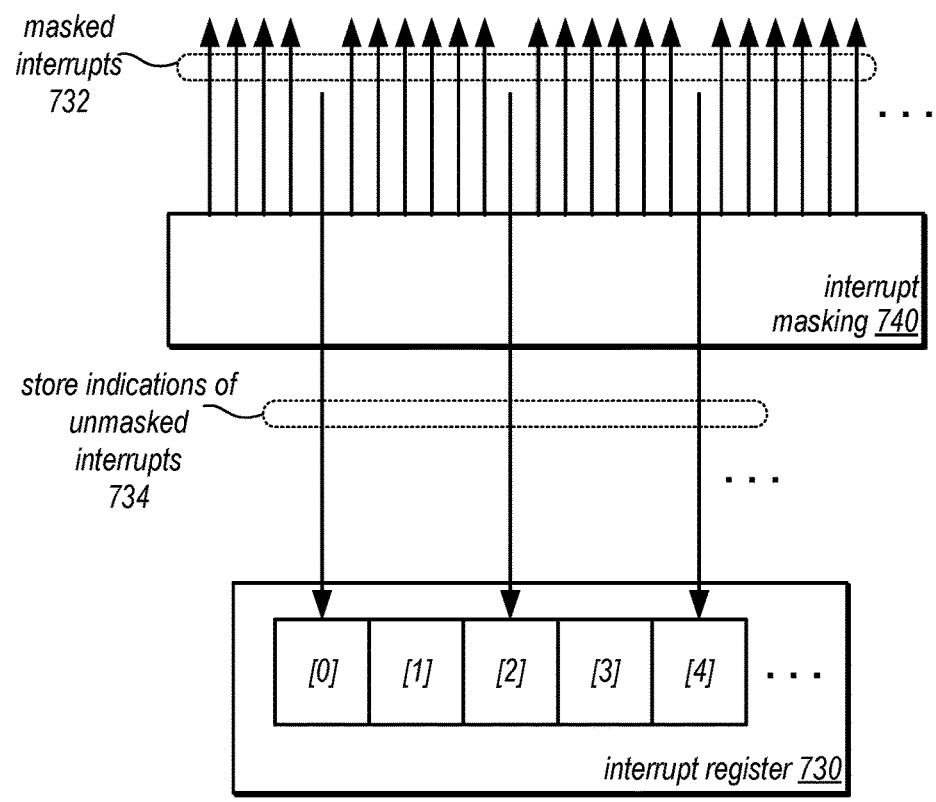
Figure 8:
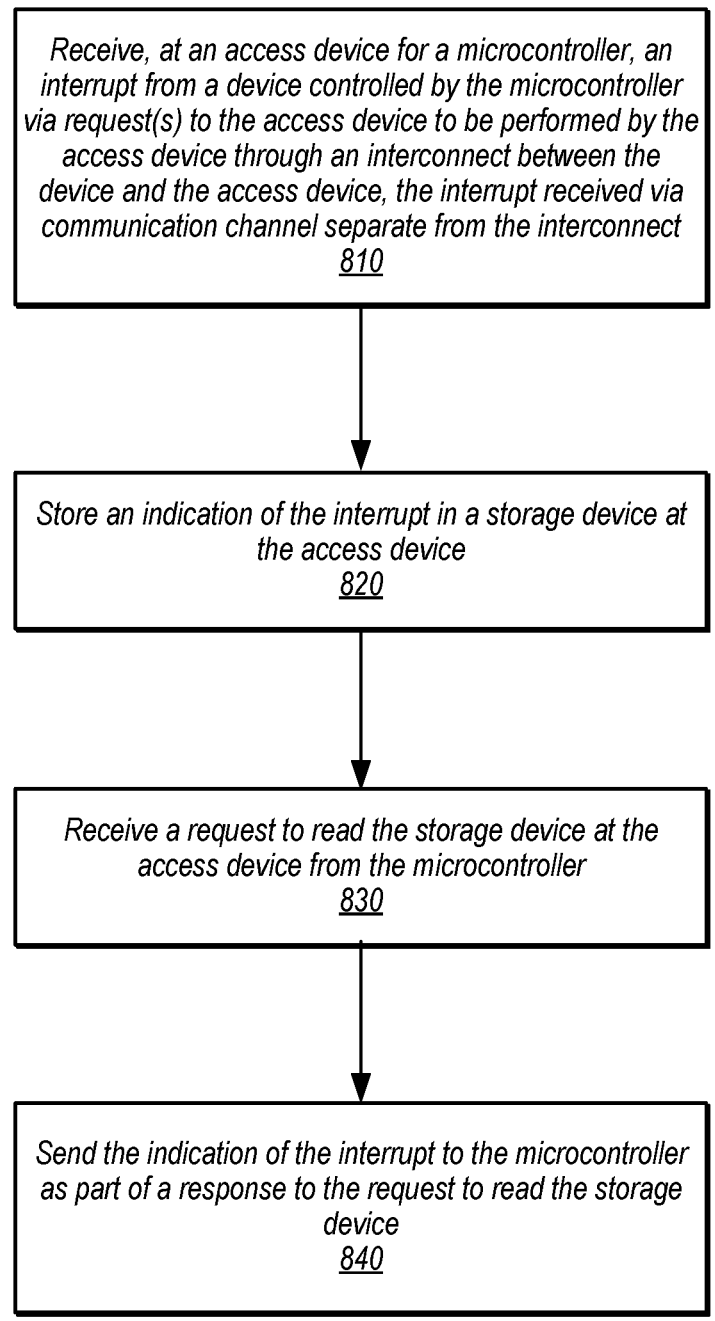
FIG. 8 is a high-level flowchart illustrating various methods and techniques to implement independently configurable remapping stages for processing access requests to send via an interconnect, according to some embodiments.

As discussed in detail below with regard to FIGS. 7A-8, various encoding schemes or other organization schemes for interrupts may be implemented. For example, access device 120 may implement interrupt handling 150, which may receive and encode or otherwise organize interrupt signals for storage 154 at control status registers 130. For example, the interrupt handler may determine which location (e.g., which bit) in a CSR 130 to store an interrupt indication (e.g., to set a bit to "1"). Summaries may be implemented, in some embodiments, which may organize types of interrupts, sources of interrupts, priorities of interrupts, or other schemes of interrupt handling that may allow microcontroller 110 to handle different interrupts in optimal fashion. These device interrupt summaries 132 may be stored in control status registers 130, and read 144 to be returned to microcontroller 110. Interrupt handler 150 may implement interrupt masking 156, in some embodiments. In this way, interrupt handler 150 can signal to controlled devices 170, which interrupt signals to mask and not send to access device 120.

Control status registers 130 can store other information that may optimize the performance of microcontroller 110. For example, an identifier and/or revision information 134 may be stored for fast access by a microcontroller 110. In this way microcontroller 110 can quickly identify what type of controlled system or device is being managed, without having to know the controlled system's or device's internal address map. Furthermore, one set of software for microcontroller 110 can be used to support multiple revisions of a controlled system or device and/or multiple different controlled systems or devices.

Please note that the previous description of an access device, microcontroller, interconnect, and controlled devices, as well as various access communications, are merely provided as an examples of alternative interrupt reporting channels for microcontroller access devices. Different numbers of components or configuration of components may be implemented. For example, controlled devices may be able to write directly to control status registers or other storage devices on access device 120.

This specification begins with general descriptions of a controlled system implementing a microcontroller access device that utilizes alternative interrupt reporting channels for the microcontroller access device. Various examples of different components/modules, or arrangements of components/modules that may be implemented in the controlled system and microcontroller access control device may then be discussed. A number of different methods and techniques to implement alternative interrupt reporting channels for microcontroller access devices are then discussed, some of which are illustrated in accompanying flowcharts. Various examples are provided throughout the specification.

Figure 2:
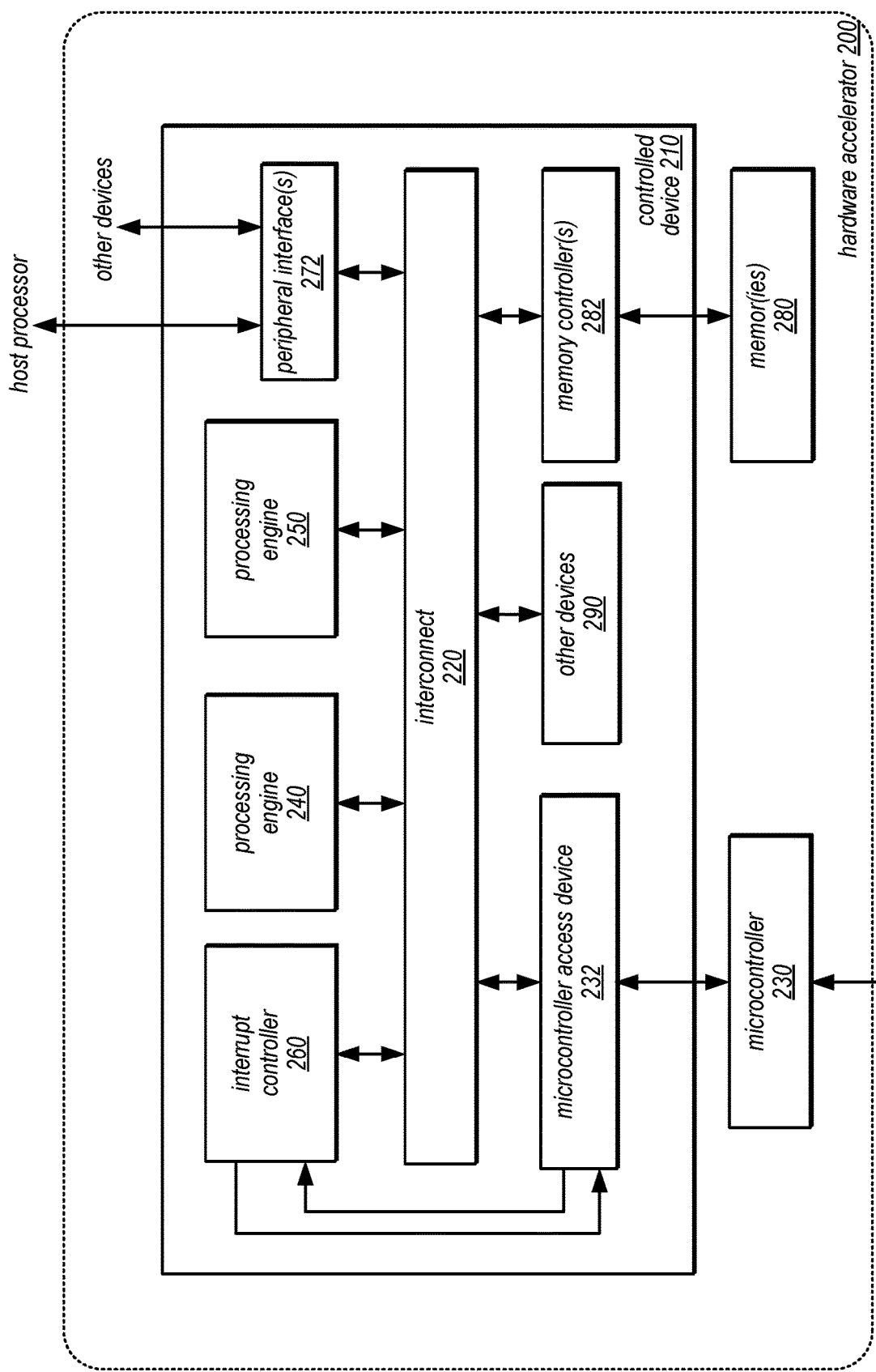
FIG. 2 is a logical block diagram illustrating an example hardware accelerator with a device controlled by a microcontroller through a microcontroller access device, according to some embodiments.

FIG. 2 a logical block diagram illustrating an example hardware accelerator with a device controlled by a microcontroller through a microcontroller access device, according to some embodiments. Hardware accelerator 200 may provide dedicated or specially optimized processing devices or components, such as various processing pipelines or other dedicated circuitry, for performing computing tasks or operations, including but not limited to, graphics processing, sound processing, network communication processing, cryptographic processing, or machine learning processing. Hardware accelerator 200 may be implemented or included in a computing system, including servers, desktop computers, mobile computing devices, or various other computing platforms, that may implement different devices that access other devices via an access control device for an interconnect, as discussed below with regard to FIG. 9.

In some embodiments, hardware accelerator 200 may be implemented on or include a system-on-a-chip, implemented or connected to other systems (e.g., a host as noted above) to perform various specialized operations. For example, different hardware accelerators (including different processing engine types for the same types of hardware acceleration processing, such as different kinds of graphics processing engines) may be implemented on host systems to perform work in response to requests or as part of implementing user applications on a host system. In some embodiments, hardware accelerators 200 may be implemented on host systems as part of a service provider network, which may offer hardware and software resources to clients of the service provider network, which may execute user applications as a tenant on service provider network resources, including hardware accelerator 200.

In some embodiments, hardware accelerator 200 may implement one (or more) controlled devices, such as controlled device 210. Controlled device 210 may implement various features, sub-components, or other devices implemented as part of hardware accelerator 200, which may be managed by microcontroller 230, such as interrupt controller 260, processing engine 240, processing engine 250 (which may in some embodiments be a different type of processing engine than processing engine 240—or it may be the same type of processing engine). Microcontroller 230 may be programmable by a host processor to implement different software (e.g., firmware) for controlling the devices implemented on controlled device 210. A microcontroller access device 232 (which may be similar to access device 120 discussed above with regard to FIG. 1) may be implemented for microcontroller 230, which may support management communications from microcontroller 230 to devices on controlled device 230 via interconnect 220.

As noted above, controlled device may implement different types of processing engines which may be managed by microcontroller 230, in some embodiments, and which may perform different functions that support hardware acceleration. For example, in one embodiment, processing engine 240 may be hardware specialized for machine learning calculations, such as neural network model calculations. Processing engine 250, however, may be hardware that performs specialized compilation of machine learning applications that generate, train, and apply machine learning models on processing engine 240. These processing engines may utilize other resources of hardware accelerator 200 over interconnect 220, such as memor(ies) 280 via memory controller(s) 282, or may communicate with other devices (e.g., other hardware accelerators implemented on a same circuit board or host processors via peripheral interfaces 272 (e.g., Peripheral Component Interconnect Express (PCIe)).

Other devices of host system 210, connected to interconnect 220 may also be managed by microcontroller access device 230. For example, an interrupt controller 260, which may handle various interrupts generated by other components of controlled device 210, may communicate via interconnect 220 with other features, components, or devices implemented as part of controlled device 210. In some embodiments, interrupt controller 260 may have direct connections to different components (e.g., processing engines 240 and 250) so that interrupts generated by a component may be directly sent to the interrupt controller, which may then produce summaries of the interrupts that are sent via the direct connection between the interrupt controller and the microcontroller access device to the microcontroller access device. As discussed above with regard to FIG. 1, direct communication channel may be implemented between interrupt controller 260 and microcontroller access device 232 to signal interrupts to microcontroller 230 (and receive mask signals from microcontroller access device 232). Note, that in some embodiments, other devices, such as processing engines 240 and 250, memory controller(s) 282, and/or other devices 290 may implement direct communication channels with microcontroller access device 232 to signal interrupts and/or receive interrupt masking signals.

In some embodiments, a direct connection (e.g., a wire) between microcontroller access device 232 to microcontroller 230 (or from interrupt controller 260 to microcontroller 230) may be implemented to send an interrupt signal to microcontroller 230. In such embodiments, when an interrupt (e.g., any unmasked summary bit) is asserted (e.g., in the interrupt controller 260 to microcontroller access device 232 or directly to microcontroller 230), the interrupt signal is asserted to the microcontroller 230. The microcontroller may then go read microcontroller access device 232 to see what interrupts are asserted. Microcontroller 230 can assert the masks for the interrupts that it is currently handling (which will cause the interrupt wire from the controlled device 210 to the microcontroller 230 to negate) in case other interrupts occur which will cause the interrupt to the microcontroller 230 to assert again, in some embodiments.

In some embodiments, interconnect 220 may be one of various different kinds of bus architectures, such as Advanced eXtensible Interface (AXI). Access requests, such as read or write requests, may be sent via interconnect 220 in order to reach a destination device, such as access requests sent from processing engine type A, sent via independently configurable access control device 230a to send read and write commands to memor(ies) 280.

Other devices 280 may be implemented as part of controlled device 210 (or separately from controlled device similar to microcontroller 230) which may also connect via interconnect 220 to devices implemented on controlled device 210. For example, other communication protocols and devices, such a various timer(s), other memory/storage devices, General Purpose Input/Output (GPIO), Advanced Peripheral Bus (APB), Joint Test Action Group (JTAG), Universal Asynchronous Receiver/Transmitter (UART), and/or other devices may be implemented to support various hardware accelerator 200 and controller device 210 features.

In some embodiments, hardware may implement memor(ies) 280, which may be various types of memory technologies, such as Dynamic Random Access Memory (DRAM) (or other memory such as static random access memory (SRAM), synchronous dynamic RAM (SDRAM), nonvolatile/Flash-type memory, or any other type of memory). Memor(ies) 280 may store instructions, weights and other data for other devices of controlled device 210 (e.g., processing engines 240 and 250).

As noted above, different protocols may be implemented to support management functions performed by a microcontroller with respect to controlled devices. FIG. 3 is a logical block diagram illustrating an example communication protocol between a microcontroller and microcontroller access device, according to some embodiments. Microcontroller 310 (e.g., similar to microcontroller 110 or 230 in FIGS. 1 and 2) may submit a protocol request 312 to microcontroller access device 320 (e.g., similar to access device 120 or microcontroller access device 232 in FIGS. 1 and 2). The protocol request 312 may include different commands to perform different requests (which are sometimes referred to as transactions), in some embodiments. For example, a write memory request or read memory request may be a request to write to a memory or read from a memory of a controlled device via the interconnect connected to microcontroller access device 320. In some embodiments, protocol request 312 may be a request to write to or read from a local storage device at microcontroller access device 320, such as a write register or read register request. In some embodiments, protocol response 314 may include a prior transaction status (e.g., the success or failure of a prior transaction as discussed in various examples below), which may be in addition to requested data (e.g., for a read request).

In some embodiments, SPI-based protocol may be implemented for protocol requests 312 and responses 314. For example, in some embodiments different bytes for protocol requests 312 and responses 314 may include information that specifies "CMD" which may be transaction protocol request 312 encodings, "ADDR" which may be a portion of an address to use for a read or write (e.g., the lower 32 bits of address for "Write Mem Word" and "Read Mem Word" transactions), "WDATA" which may be the data to write (e.g., 32 bit write data for "Write Mem Word" or "Write Register" transactions), "RDATA" which may be the data to read from a register (e.g., 32 bit read data for "Read Register" transactions), "RSP" which may be transaction protocol response 314 encodings, "PTPS" which may be previous transaction protocol status encodings, and "NOP" which may be a "no operation" indication. Different requests and responses discussed below may utilize the information specified above.

For example, SPI protocol may include "Write Mem Word Transaction" that causes the microcontroller access device 320 to generate a 32 bit write on the interconnect interface to controlled devices (not illustrated). The lower 32 bits of write address and the 32 bits of write data may be received as part of a "Write Mem Word Transaction." The upper 32 bits of write address may be taken from a microcontroller access device 320 "Upper Address Window" register. In some embodiments, microcontroller 310 may have to issue one or more "Return Mem Response Transactions" to microcontroller access device 320 in order to determine the completion status of the "Write Mem Word Transaction." The "Return Mem Response Transactions" can be issued immediately after the "Write Mem Word Transaction," or microcontroller 310 can choose to wait before issuing the "Return Mem Response Transactions." If microcontroller access device 320 responds with "Write Mem Word Access in Progress," then microcontroller 310 may have to issue another "Return Mem Response." In at least some embodiments, microcontroller 310 may not issue a new "Write Mem Word Transaction" or "Read Mem Word Transaction" to microcontroller access device 320 until the completion status (success or failure) of the active "Write Mem Word Transaction" is returned by microcontroller access device 320.

In some embodiments, receiving a "Read Mem Word Transaction" may cause the microcontroller access device 320 to generate a 32 bit read on the microcontroller access device 320 interconnect interface to controlled device(s) (as discussed above with regard to FIG. 1). The lower 32 bits of write address may be received as part of the "Read Word Transaction" in some embodiments. The upper 32 bits of read address may be taken from the microcontroller access device 320 "Upper Address Window register" in some embodiments. Microcontroller 310 may have to issue one or more "Return Mem Response Transactions" to microcontroller access device 320 in order to determine the completion status of the "Read Mem Word Transaction," in some embodiments. The "Return Mem Response Transactions" can be issued immediately after the "Read Mem Word Transaction," or the microcontroller 310 can choose to wait before issuing the "Return Mem Response Transactions." If microcontroller access device 320 responds with "Read Mem Word Access in Progress," then microcontroller 310 may have to issue another "Return Mem Response."

If microcontroller access device 320 returns a response indicating the read has completed successfully, microcontroller 310 can access the data read from memory by issuing a "Read Mem Data Register Transaction" in some embodiments. Microcontroller 310 may not issue a new "Write Mem Word Transaction" or "Read Mem Word Transaction" to microcontroller access device 320 until the completion status (success or failure) of the active "Read Mem Word Transaction" is returned by microcontroller access device 320, in some embodiments.

In some embodiments, receiving a "Write Register Transaction" may cause microcontroller access device 320 to generate a 32 bit write to the selected register. The address of the register to write is encoded in the "Write Register CMD byte." The 32 bits of write data may be received as part of the "Write Register Transaction" from microcontroller 310. As noted earlier, because the registers to write are local to microcontroller access device 320, the "Write Register Transaction" can be completed immediately, so the response byte is part of the "Write Register Transaction".

In some embodiments, receiving a "Read Register Transaction" causes the microcontroller access device 320 to generate a 32 bit read to the selected register. The address of the register to read may be encoded in the "Read Register CMD byte." Because the registers to read are local to microcontroller access device 320, the read transaction can be completed immediately, so the response byte and 32 bits of read data are part of the "Read Register Transaction."

In some embodiments, receiving a "Return Mem Response Transaction" causes the microcontroller access device 320 to read and return the last valid response stored at the microcontroller access device 320 (e.g., in a control status register, such as transaction state 136 in FIG. 1). If no valid response is available, microcontroller access device 320 may return the "Unexpected Memory Response Request," in some embodiments.

Protocol supported by microcontroller 310 and microcontroller access device 320 may include different protocol error responses. For instance, in the example SPI-based protocol, different errors may be indicated. In some embodiments, if a transaction is received that has an undefined CMD encoding, microcontroller access device 320 may return an "Invalid Command Received" response on the following byte, and will continue returning "Invalid Command Received" on all subsequent bytes until a select signal for microcontroller access device 320 is driven high by microcontroller 310. The Invalid Command Received encoding may be "0xFF." If the invalid command was caused by a timing error on the interface between microcontroller 310 and microcontroller access device 320, then having the "Invalid Command Received" response be all "one values" may allow microcontroller 310 to eventually receive the correct response.

If a "Return Mem Response" transaction is received but the interconnect interface at microcontroller access device 320 has a response register that is invalid, the microcontroller access device 320 may return an "Unexpected Memory Response Request" response.

Figure 4:
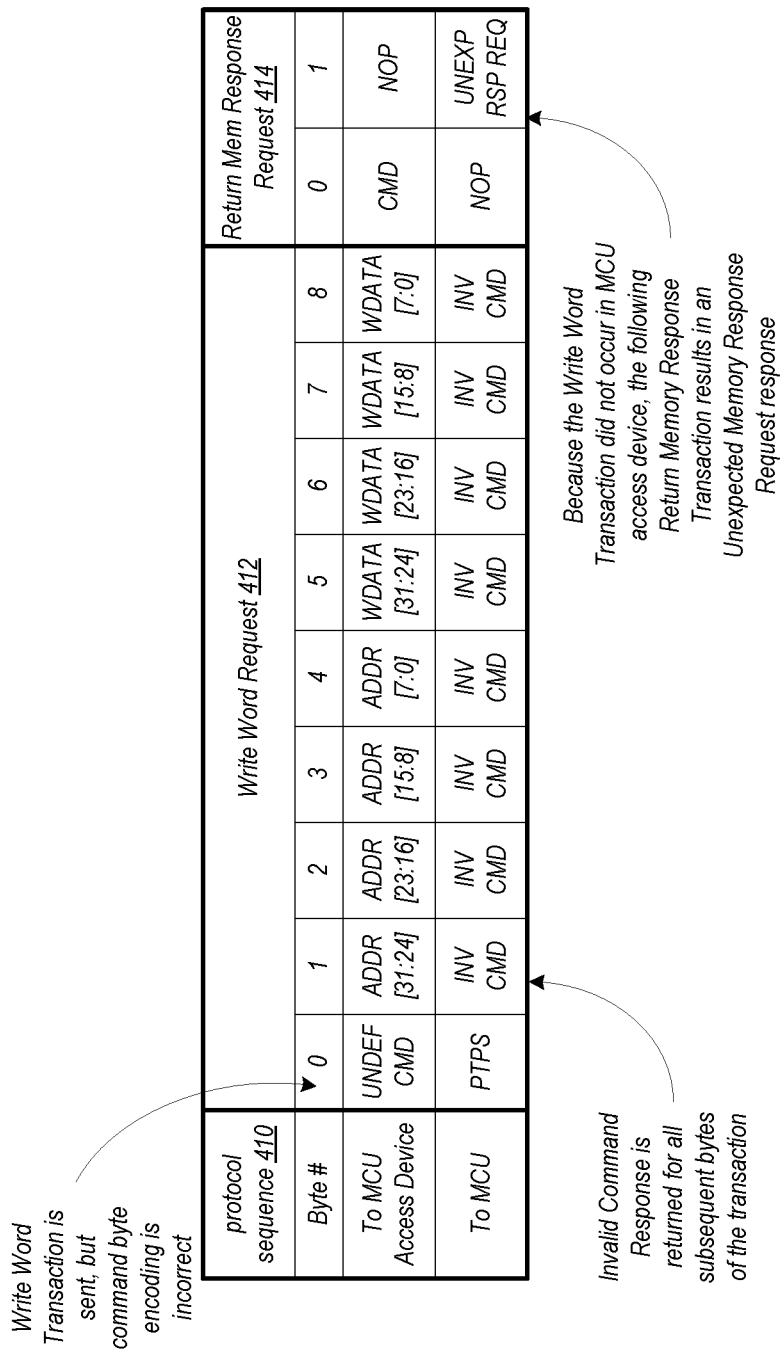
FIG. 4 illustrates an example protocol sequence that illustrates invalid command and unexpected memory response requests, according to some embodiments.

FIG. 4 illustrates an example protocol sequence that illustrate invalid command and unexpected memory response request, according to some embodiments. Protocol sequence 410 may illustrate a line that indicates the request sent to the microcontroller access device, "To MCU Access Device" and the response sent from the microcontroller access device to the microcontroller, "To MCU." In FIG. 4, a "Write Word Transaction" request 412 is sent. However, the command byte encoding is incorrect (as illustrated by "UNDEF CMD"). Therefore, the protocol response "To MCU" line may indicate in the first byte a signal of "PTPS" and then the type of error, which is encoded as "INV CMD" returned for all subsequent byte of the transaction. In this way, the indication of the invalid command is returned in the first byte of the following transaction.

Protocol sequence 410 illustrates another type of error response. A "Return Mem Response" request 414 may be sent. However, as the prior request 412 did not occur, the following response returns an "Unexpected Memory Response Request" response (as indicated by "UNEXP RSP REQ").

In some embodiments, there may be transaction error types that cannot be detected by microcontroller access device 320 until all bytes of the transaction have been received. These error types may be called Previous Transaction Protocol Errors. The protocol status for a previous transaction may be returned in the first response byte of the next transaction, in some embodiments (as indicated in response 314). In some embodiments, this status may be the Previous Transaction Protocol Status (PTPS) byte.

Figure 5:
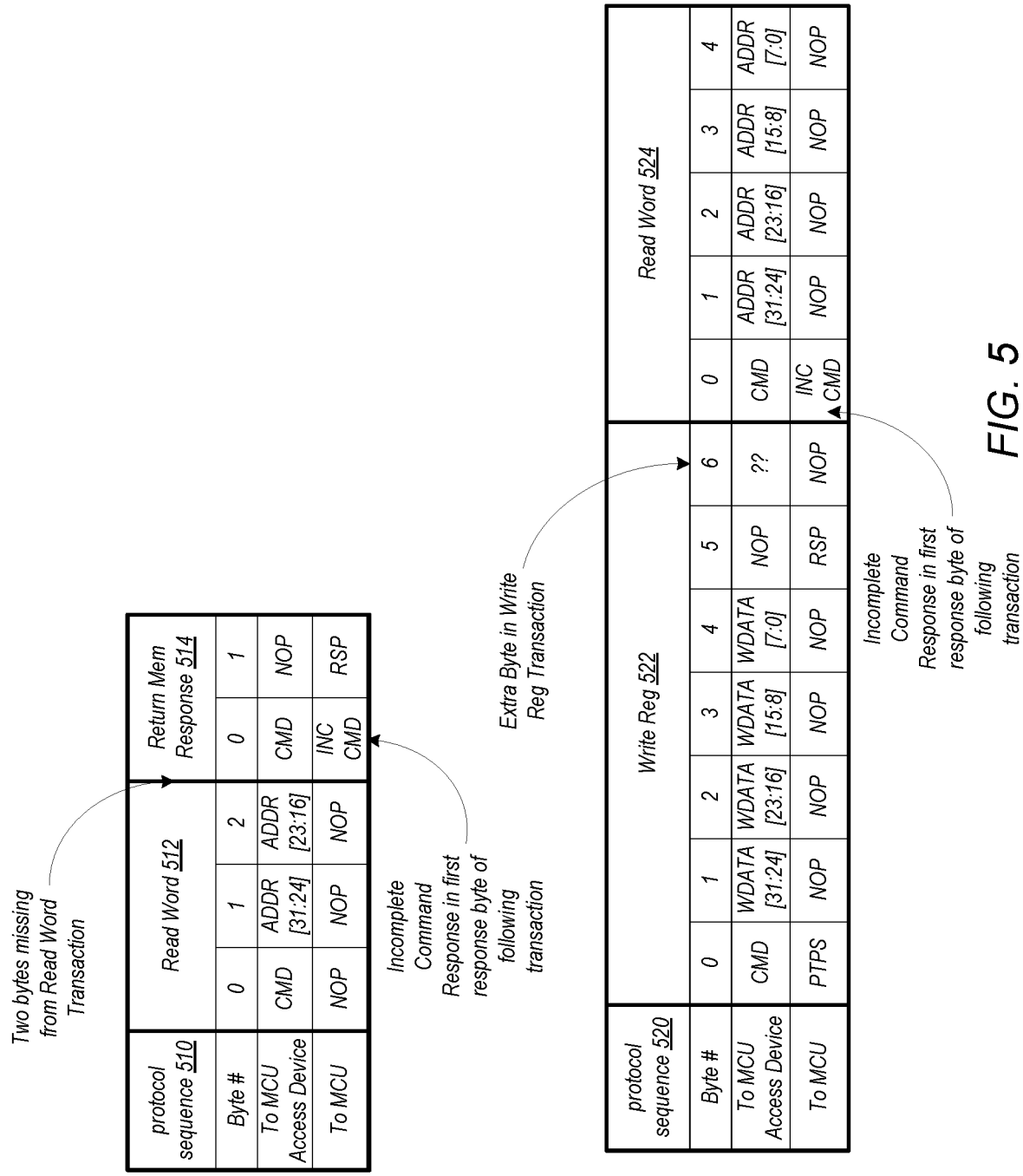
FIG. 5 illustrates example sequence protocols that illustrate incomplete commands indicated in a protocol response, according to some embodiments.

For example, if a transaction is received and the received number of bytes do not match the expected number of bytes for the transaction, the microcontroller access device 320 returns an Incomplete Command Received response on the first byte of the following transaction, which may be one example of a previous transaction protocol error. FIG. 5 illustrates example sequence protocols that illustrate incomplete command s indicated in a protocol response, according to some embodiments.

Protocol sequence 510 illustrates an example read word request 512. Read word request 512 may be sent but be missing two bytes, bytes 3 and 4, from the command. In a return mem response request 514 from a microcontroller, the microcontroller access device may return a response that indicates Incomplete command received, in the first byte of the following transaction.

Protocol sequence 520 illustrates an example write register request 522. In write register request 522, an extra byte, byte 6, is included in the request 522. When a subsequent request is sent, read word request 524, the indication of the Incomplete Command Response is signaled in the first response byte of the following transaction (read word request 524), which indicates the status the prior transaction (write register request 522) is an incomplete command.

Another example of a previous transaction protocol error may occur if a "Write Mem Word" or "Read Mem Word" transaction is received and a previous "Write Mem Word" or "Read Mem Word" transaction has not been completed, the microcontroller access device 320 may return a "Memory Transaction Dropped" response on the first byte of the following transaction. FIG. 6 illustrates an example protocol sequence that indicates a memory transaction dropped response, according to some embodiments.

For example, protocol sequence 610 may include a read word request 612 from a microcontroller. The microcontroller may then send a return mem response request 614. The PTPS indication in the first byte may indicate that the interconnect transaction for the first read has not completed. Microcontroller may send a second read word request 616. However, as the first read word request 612 has not been indicated as completed, then when a return mem response request 618 is sent, the microcontroller access device may send an indication on the status of the second transaction (read word request 616), indicating that the transaction was dropped ("MEM TXN DRP") and that the first read word request completed successfully, as indicated by "RD SUCCESS."

Another example of a previous transaction protocol error may occur if a microcontroller access device 320 "Interface Timeout Counter" expires during a transaction, the microcontroller access device 320 may return an "Interface Timeout" response on the first byte of the following transaction.

As noted above with regard to FIGS. 1 and 2, alternative interrupt reporting channels may be implemented so that a microcontroller can read and write storage devices, such as control status registers, on a microcontroller access that can communicate directly with other controlled devices without using an interconnect to access those other devices. In this way, debug or other information provided by interrupt signals can be accessed even if the interconnect is hung, blocked, or otherwise stopping communications. Moreover, the time to retrieve interrupt information by a microcontroller can be greatly reduced because access locally stored (at the microcontroller access device) interrupts can be retrieved by a microcontroller in a single protocol request—instead of the multiple protocol requests that may have to be sent to retrieve the interrupts from the controlled devices over the interconnect.

In addition to the improvements described above, different encoding techniques can be implemented for interrupt signals, in some embodiments. For example, a microcontroller may handle large number of interrupts (e.g., thousands of interrupts) for a group of controlled devices. In order to prioritize these interrupts, different techniques such as summarizing and/or masking interrupts may be implemented. For instance, in FIG. 7A, interrupt summarizing 720 may be implemented for reported interrupts 712, that are stored in interrupt register 710. Interrupt summarizing 720 may aggregate interrupts into an individual bit value in a register. For example, stored summary bits 714 may store indications of interrupts 712 that correspond to one of the summary bits, so that if any one of the corresponding or mapped interrupts of a summary bit are signaled, then that corresponding summary bit is set. Interrupt summarizing 720 may implement different summarizing schemes according to prioritization or other microcontroller processing use cases or scenarios. For instance, in some embodiments, interrupts signaled from a same controlled device (e.g., a same processing engine) may set or assert an individual bit corresponding to the controlled device. In another embodiments, critical or other high priority interrupts may be signaled into a common one (or multiple) bits of interrupt register 710, so different summary bits may indicate priority levels for corresponding interrupt signals.

Other techniques may be applied in addition to (or instead of) bit summaries. For example, in FIG. 7B interrupt masking 740 may be applied to mask 732 some (e.g., a majority of interrupts). In this way, only indications of those unmasked interrupts 734 may be stored in interrupt register 730. For example, a microcontroller can write bit masks into a control status register at a microcontroller access device in order to have those bitmasks signaled to controlled devices (or otherwise applied), reducing the number of interrupts that microcontroller would handle. Bit masks can be changed, in some embodiments. For example, a microcontroller may change bit masks in different operation modes for controlled devices (e.g., a startup phase, a running phase, a shutdown phase, etc.).

The examples of an independently configurable access control device as discussed above with regard to FIGS. 1-7B have been given in regard to an example microcontroller access device. Note that various other types or configurations of microcontroller access devices may implement alternative interrupt reporting channels for controlled devices and thus may implement these techniques. In addition to examples given above, the techniques discussed below with regard to FIG. 8 may be also implemented using the various components discussed above as well as different types of systems or devices that provide access to a microcontroller to perform management of controlled devices via an interconnect.

As indicated at 810, an interrupt may be received at an access device for a microcontroller, in some embodiments. The interrupt may be received from a device controlled by the microcontroller in some embodiments. For example, the interrupt may be sent from a component of an SOC or other embedded system that is controlled by the microcontroller. The interrupt may be one of many different interrupts that may be received at the access device from the controlled device (or another controlled device, such as an interrupt controller), in some embodiments. The interrupt may be received via a communication channel separate from the interconnect. For example, the communication may utilize a separate transmission medium than the interconnect, such as a separate wire (and/or different type of wire or other transmission medium), in some embodiments. In this way, the communication of the interrupt may not be subject to failure or interference correlated with the interconnect, in some embodiments. In some embodiments, the interrupt may be signaled using a different interface or protocol than is used to send communications via the interconnect.

As indicated at 820, an indication of the interrupt may be stored at a storage device at the access device, in some embodiments. For example, the interrupt signal may be directly stored to a corresponding bit in a register, to indicate that if the bit is set to one, the interrupt has been signaled by the device. In some embodiments, the indication of the interrupt may be included in a summary of interrupts. For instance, as discussed above with regard to FIG. 7A, a summary scheme may be implemented that aggregates multiple interrupts into a single register or indication, which may be aggregated according to priority, source device, or other encoding scheme. Although not illustrated, interrupt masking may be implemented instead of or in addition to interrupt summaries so that only the unmasked interrupts may be summarized at the storage device of the microcontroller access device.

As indicated at 830, a request may be received to read the storage device at the access device from the microcontroller, in some embodiments. The request may be specified according to the protocol supported by the microcontroller, such as discussed above with regard to FIG. 3. For example, a read register request may be received that specifies an address and/or storage device (e.g., a control status register). As indicated at 840, the indication of the interrupt may be sent to the microcontroller as part of a response to the microcontroller, in some embodiments. For example, a response may include multiple bits in addition to the bit that indicates the interrupt.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible.

Figure 9:
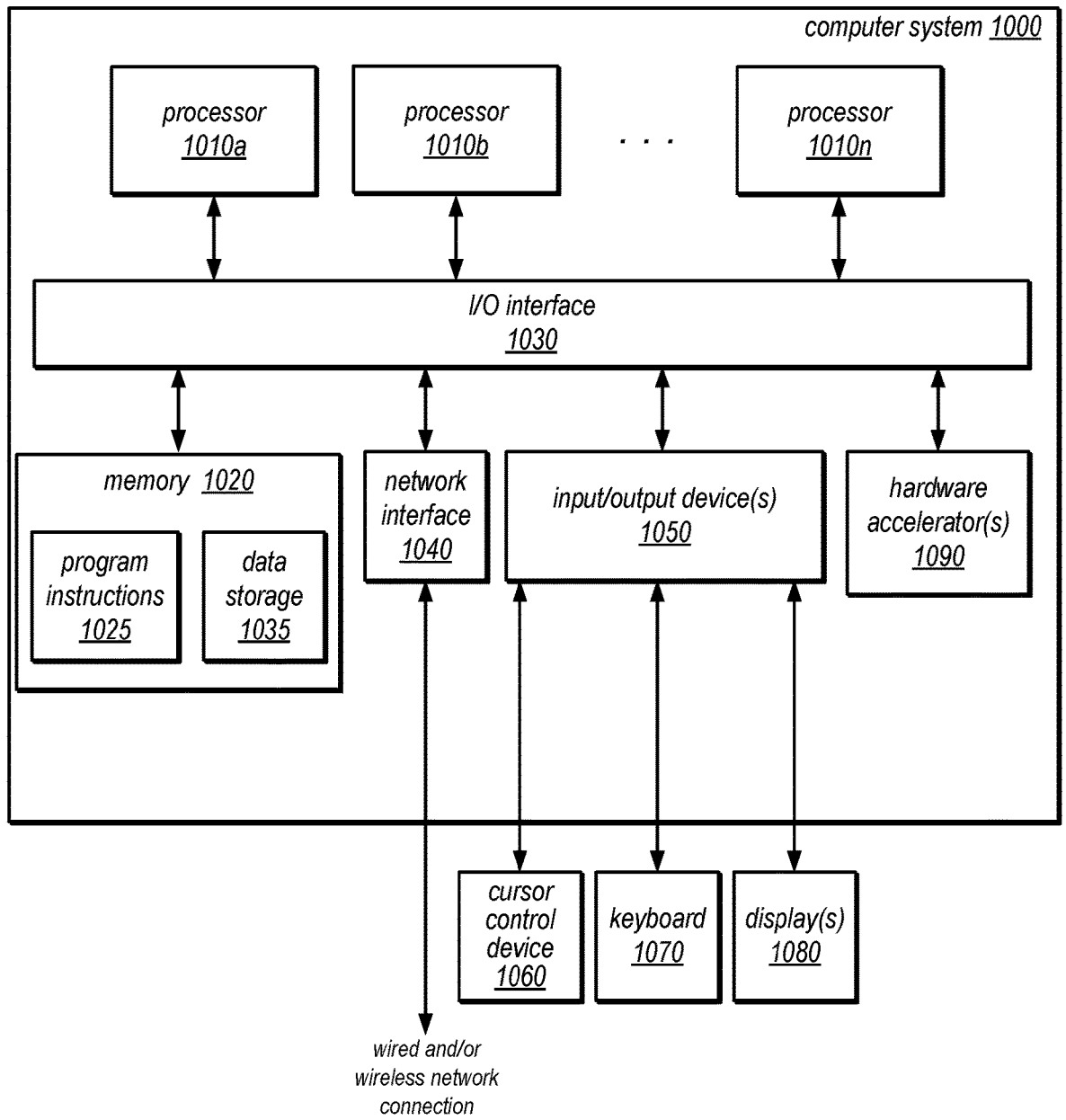
FIG. 9 is a logical block diagram of an example computer system, according to some embodiments.

Embodiments of a host system which may include or interact with an access device and microcontroller, as discussed above may be implemented as part of a computer system. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 1000 includes one or more processors 1010 coupled to a system memory 1020 via an input/output (I/O) interface 1030. Computer system 1000 may include one or more hardware accelerators 1090 (e.g., similar to hardware accelerator 200 discussed above with regard to FIG. 2), in some embodiments. However, in other embodiments, other hardware systems or devices that utilize controlled devices, a microcontroller, and a microcontroller access device may be implemented. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/ output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 2000 or may be distributed on various nodes of computer system 2000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, that may implement the various computing resources as described herein for a host system, and data storage 1035, comprising various data accessible by program instructions 1025. In one embodiment, program instructions 1025 may include software elements of embodiments of a host (e.g., a hypervisor implementing a virtualization platform, container-based virtualization, or other hosting platforms for computing resources) as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a microcontroller for a device, wherein the microcontroller connects to an access device via a microcontroller interface;
the access device, wherein the access device connects the microcontroller to the device via an interconnect to perform requests directed to the device formatted according to the microcontroller interface implemented by the access device, wherein the access device comprises an interrupt handler separate from the microcontroller, and wherein the requests formatted according to the microcontroller interface include a first request to control the device via the interconnect based at least in part on one or more transaction states stored in a control status register (CSR);
the device, wherein the device has a direct communication channel to access the CSR at the access device, the direct communication channel separate from the interconnect; and
wherein the access device is configured to:
receive, from the device via the direct communication channel, an interrupt that occurred at the device;
store, by the interrupt handler of the access device, an indication of the interrupt in the CSR to indicate receipt of the interrupt signaled from the device; receive, via the microcontroller interface, a second request to read the CSR from the microcontroller; and return, to the microcontroller via the microcontroller interface, the indication of the interrupt as part of a response to the second request to read the CSR.

2. The system of claim 1, wherein to store the indication of the interrupt in the CSR, the access device is configured to aggregate the interrupt into an interrupt summary that identifies a plurality of interrupts by asserting an individual bit in the CSR.

3. The system of claim 1, wherein the access device is configured to:
receive, via the microcontroller interface, a mask for interrupts; and
apply the mask to a plurality of interrupts received via the direct communication channel, the plurality of interrupts including the interrupt, wherein the interrupt is an unmasked interrupt.

4. The system of claim 1, wherein the response to the second request indicates a status of a previous request received from the microcontroller via the microcontroller interface.

5. A method, comprising:
receiving, at an access device for a microcontroller connected to the access device via a microcontroller interface, an interrupt from a device controlled by the microcontroller, wherein the interrupt is received from the device via a communication channel that is separate from an interconnect between the access device and the device, wherein the access device receives a first request from the microcontroller to control the device and performs the first request to control the device via the interconnect, wherein the access device comprises an interrupt handler signaled from the device and the interrupt handler is separate from the microcontroller, and wherein the requests formatted according to the microcontroller interface include a first request to control the device via the interconnect based at least in part on one or more transaction states stored in a storage device;
storing, by the interrupt handler of the access device, an indication of the interrupt in the storage device at the access device to indicate receipt of the interrupt;
receiving, from the microcontroller and at the access device, a second request to read the storage device, wherein the second request is formatted according to the microcontroller interface; and
sending the indication of the interrupt to the microcontroller via the microcontroller interface as part of a response to the second request to read the storage device.

6. The method of claim 5, further comprising:
receiving, via the microcontroller interface, a mask for interrupts; and
applying the mask to a plurality of interrupts received via the communication channel, wherein the plurality of interrupts includes the interrupt, and wherein the interrupt is an unmasked interrupt.

7. The method of claim 5, wherein the storage device is a Control Status Register (CSR), wherein storing the indication of the interrupt in the storage device comprises storing the indication of the interrupt into an individual bit in the CSR that provides an interrupt summary, wherein the individual bit indicates whether one or more of the plurality of interrupts, including the interrupt, has occurred.

8. The method of claim 7, wherein the plurality of interrupts indicated by the individual bit in the CSR are received from a common source.

9. The method of claim 5, wherein the response to the second request indicates a status of a previous request received from the microcontroller via the microcontroller interface.

10. The method of claim 9, wherein the status of the previous request received from the microcontroller is an error status.

11. The method of claim 10, wherein the response to the second request also indicates a microcontroller interface timeout error.

12. The method of claim 5, wherein the device is implemented on a system-on-a-chip (SoC), wherein the storage device at the access device stores an identifier for the SoC, and wherein the method further comprises;
receiving another request to read the storage device at the access device from the microcontroller, wherein another request specifies a portion of the storage device that stores the identifier for the SoC; and
returning, in another response to the microcontroller, the identifier for the SoC.

13. An access device for a microcontroller, the access device comprising an interrupt handler separate from the microcontroller and circuitry configured to:
perform requests received from the microcontroller via a microcontroller interface directed to a device connected to the access device via an interconnect, wherein the microcontroller connects to the access device via a microcontroller interface, and wherein the requests formatted according to the microcontroller interface include a first request to control the device via the interconnect based at least in part on one or more transaction states stored in a storage device;
receive, from the device and via a communication channel separate from the interconnect, an interrupt that occurred at the device;
store, by the interrupt handler of the access device, an indication of the interrupt in the storage device at the access device to indicate receipt of the interrupt signaled from the device;
receive, from the microcontroller and via the microcontroller interface, a second request to read the storage device; and
return, to the microcontroller via the microcontroller interface, the indication of the interrupt as part of a response to the second request to read the storage device.

14. The access device of claim 13, wherein to store the indication of the interrupt in the storage device, the circuitry of the access device is configured to aggregate the interrupt into an interrupt summary that identifies a plurality of interrupts by asserting an individual bit in the storage device.

15. The access device of claim 14, wherein the interrupt summary identifies the plurality of interrupts according to a common priority of the interrupts.

16. The access device of claim 13, wherein the circuitry of the access device is further configured to:
receive, via the microcontroller interface, a mask for interrupts; and
apply the mask to a plurality of interrupts received via the separate communication channel including the interrupt, wherein the interrupt is an unmasked interrupt.

17. The access device of claim 13, wherein the storage device is a Control Status Register (CSR), and wherein the access device comprises a protocol command execution stage, configured to:

interpret the second request to read the storage device according to a protocol supported by the protocol command execution stage;

perform a read to the CSR in response to interpreting the second request to read the storage device; and perform the return, to the microcontroller via the microcontroller interface, the indication of the interrupt as part of the response to the second request to read the storage device, wherein the response is returned according to the protocol.

18. The access device of claim 13, wherein the storage device is a Control Status Register (CSR), and wherein the interrupt handler configured to:

determine a location in the CSR to store the indication of the interrupt; and write the indication of the interrupt to the location in the CSR to perform the store of the indication.

19. The access device of claim 13, wherein the device is an interrupt controller for one or more other devices controlled by the microcontroller and implemented on a system-on-a-chip (SoC).

20. The access device of claim 13, wherein the access device comprises a protocol command execution stage that supports a protocol for control requests received from the microcontroller via the microcontroller interface, and wherein the protocol command execution stage is configured to:

include in the response to the second request an indication of a status of a previous request received from the microcontroller via the microcontroller interface according to the protocol.

* * * * *